April 9, 1929.  F. W. ROLLER  1,708,900
ADJUSTABLE DEVICE FOR INSTRUMENTS
Filed Sept. 10, 1927
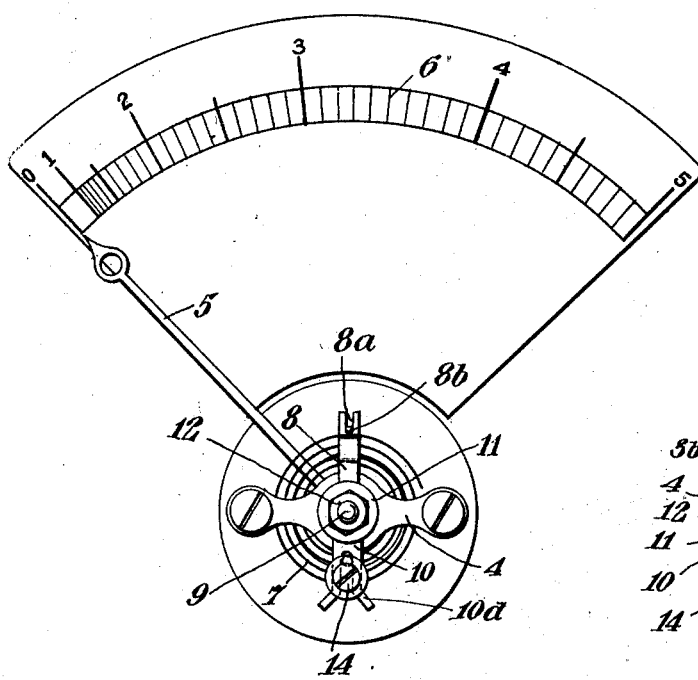
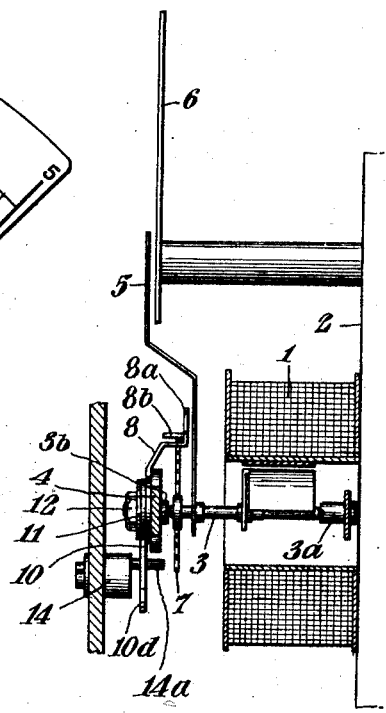
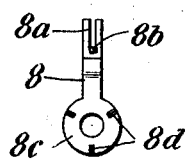
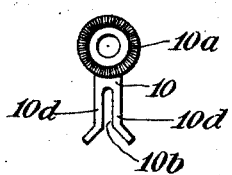
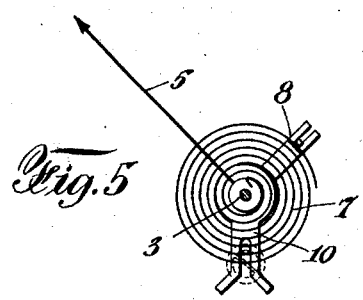
INVENTOR.
FRANK W. ROLLER
BY
Edwards, Lager & Bower,
ATTORNEYS.

Patented Apr. 9, 1929.

1,708,900

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ADJUSTABLE DEVICE FOR INSTRUMENTS.

Application filed September 10, 1927. Serial No. 218,595.

This invention relates to an improvement in means for adjusting the zero position and range of movement of the indicating needle of instruments, and is particularly applicable to electrical instruments such as volt meters and ammeters. Instruments of the character to which this invention is applicable are commonly provided with a spring, one end of which is connected to a fixed point and the other to the movable element for the purpose of properly opposing the deflecting force and give a proper scale reading, according to the current or voltage to be measured. In the use of such instruments, it is sometimes necessary to occasionally adjust the zero position of the indicating element. For this purpose, the manufacturer usually provides external controlling means for slight angular adjustment of the fixed point of the spring, without changing the spring length, so as to bring the instrument needle to a correct zero reading.

In the manufacture of such an instrument, however, it is necessary, in some way, to secure adjustment of the range of movement of the indicating needle so that it will be deflected to the full scale reading when subjected to the full current for which the instrument is intended. This adjustment is required because although instruments for the same capacity are made alike, as nearly as possible, yet it is generally found necessary to adjust the end scale position of the pointer, owing to differences in spring torque, difference in air gaps, permeability of the iron, and other variations in manufacture. This adjustment has previously been made by adding extra turns to the field winding if the instrument deflection is too low, or by removing turns from the field winding if the instrument deflection is too high; or else by altering the effective length of the spring by rotating its point of attachment to the staff and resecuring its free end to its abutment in the new position thus caused. These methods of adjusting the instrument to give correct full scale reading are awkward to accomplish, take considerable time, and are expensive.

The object of this invention is to provide a simple form of means for adjusting the full scale deflection of the instrument, and also provide means for adjusting the zero position of the pointer and which will permit adjustments to be conveniently and quickly accomplished. A further object is to provide means of this character which will be of neat appearance and occupy small space. Other objects and advantages will be understood from the following description and accompanying drawings illustrating a preferred embodiment of this invention.

Fig. 1 is a vertical cross-section of an instrument embodying this invention, certain parts not being shown and partly broken away for clearness; Fig. 2 is a front elevation; Fig. 3 is a top plan view of one portion of the adjusting means; Fig. 4 is a rear view of another portion of the adjusting means; and Fig. 5 is a diagram showing certain of the parts.

It will be understood that although an electromagnetic type of instrument is indicated in the accompanying drawings, that the invention may be applied to other types of instruments and the particular form shown is for the purpose of illustration. Here the instrument is shown as having a current receiving coil 1 mounted upon a base 2. The staff 3 of the movable element is suitably supported at its inner end in a bearing 3ª on the base and in an outer bearing 3ᵇ supported by the usual bridge piece 4. The staff carries the indicating needle or pointer 5 which passes over the scale 6.

The controlling spring 7 of the instrument has its inner end thereof secured to the staff 3 in a suitable manner. The outer end of the spring is secured to an adjustable arm 8. This arm is a thin metal strip and adapted to be moved in the manner and for the purposes as further described herein, and is shown as being bent to extend inwardly toward the spring and again bent to extend away therefrom, as shown at 8ª. The portion of the arm 8 which extends inwardly toward the spring is cut to form a lip 8ᵇ in its central portion which is integral with the arm at its inner end and is pressed out slightly to receive by spring pressure the outer end of the spring 7, between it and the adjoining portion of the arm, as shown in Figs. 1 and 2.

The arm 8 forms part of an enlarged perforated circular portion 8ᶜ which engages the top face of the bridge piece 4 and is adjustably rotatable on an axis concentric with the staff 3 on a stud 9 projecting outwardly from the bridge piece 4. The circular portion $8^c$ has upwardly projecting portions $8^d$ near its periphery formed by indenting the inner face.

Mounted on the stud 9 and on top of the portion $8^c$ is another adjustably rotatable element 10. This has a circular portion provided with a series of notches and projections $10^a$ near its periphery with which the projections $8^d$ are adapted to make engagement. The part 10 has outwardly projecting arms $10^d$ with a slot $10^b$ between them, as shown in Fig. 4.

A yieldable or spring washer 11 engages the outer face of the circular portion of the member 10; and a nut 12 is threaded on the end of the stud 9 to yieldably clamp the two elements 8 and 10 together in adjusted positions. The outer cover or casing 13 of the instrument carries a rotatably adjustable element 14, the inner portion of which carries an eccentrically mounted pin $14^a$ which engages the slot $10^e$.

In the adjustment of this improved instrument for correct zero and full scale reading, the scale being marked with zero and full scale reading, the instrument is first set at zero reading and the outer portion of the spring 7 is frictionally engaged within the tongue $8^b$, to give correct average length to the active portion of the spring, a certain length of the spring being permitted to extend beyond the tongue $8^b$, as indicated in Fig. 5. Full scale current is then applied to the instrument and the deflection noted. If the reading is too high, the arm 8 is moved to shorten the active length of the spring, and if the reading is too low, the arm 8 is moved to lengthen the active length of the spring. In making this adjustment, the spring is caused to slip frictionally past the tongue $8^b$, the arm 8 being turned on its axis to the position that will give correct full scale deflection. During this movement of the arm 8, the member 10 remains in its downwardly projecting position, the yieldable clamping of these two parts together and the notched engagement between the parts, permiting the part 8 to be moved without movement of the member 10. With the correct adjustment of the spring length arrived at, the end of the spring is soldered in place to the arm 8 where it engages the yieldable tongue $8^b$. It is evident that in making this adjustment, the arm 8 may be moved to any angular position desired for obtaining correct full scale deflection, without changing the position of the member 10 which remains in position to be engaged by the eccentric pin $14^a$ when the cover or enclosing casing is applied. If, after continued use, the zero reading of the instrument changes slightly, the external adjuster 14 may be turned slightly to bring the pointer to the correct zero reading. In making this adjustment, the eccentric $14^a$ rotates the member 10 and by reason of the notched engagement with the element 8, these two parts will move in unison to slightly move the position of the outer end of the spring carried by the element 8, bringing the pointer to the zero reading.

Thus, by means of this invention, the full scale adjustment of the spring is accomplished by moving the arm 8 along the length of the spring relatively to the member 10, but the structure insures that these parts will move in unison when the zero adjustment is made by the user.

Although I have shown and described one embodiment of this invention, it will be understood that various modifications may be made without departing from the scope of the invention.

I claim:

1. An instrument comprising a movable element, a controlling spring secured at one end to said element, a rotatable member carrying the other end of said spring, a second member having a yieldable engagement with said rotatable member and relatively rotatable with reference to said rotatable member, and adjustable means engaging said second member for moving said members in unison.

2. An instrument comprising a movable element, a controlling spring secured at one end to said element, a rotatable member carrying the other end of said spring, a second member having a yieldable engagement with and concentrically mounted with said rotatable member, and adjustable means engaging said second member for moving said members in unison.

3. An instrument comprising a movable element, a controlling spring secured at one end to said element, a rotatable member carrying the other end of said spring, a second member interlocked with said first member and relatively rotatable with reference to said first member, and adjustable means engaging said second member for moving said members in unison.

4. An instrument comprising a movable element, a controlling spring secured at one end to said element, a rotatable member carrying the other end of said spring, a second member engaging said first member and rotatable with reference to said first member, yieldable means for pressing said elements together, and adjustable means engaging said second member for moving said members in unison.

5. An instrument comprising a movable element, a controlling spring secured at one end to said element, and an adjustable member concentrically mounted with said element for supporting the other end of said spring, said member having a yieldable portion to frictionally engage the said other end of said spring.

6. An instrument comprising a movable element, a controlling spring secured at one end to said element, and an adjustable member concentrically mounted with said element for supporting the other end of said spring, said member having a yieldable integral tongue for frictionally engaging the said other end of said spring.

7. An instrument comprising a movable element, a controlling spring secured at one end to said element, a rotatable member concentrically mounted with the axis of said element for supporting the other end of said spring, a second rotatable member concentrically mounted with said first-named member and having a notched engagement therewith, means for yieldably pressing said members together, and adjustable means engaging said second member for moving said members in unison.

8. An instrument comprising a movable element, a controlling spring secured at one end to said element, a rotatable member carrying the other end of said spring, a second member having a yieldable engagement with said rotatable member and relatively rotatable with reference to said rotatable member, and means carried by said second member whereby said members may be moved in unison.

9. An instrument comprising a movable element, a controlling spring secured at one end to said element, a rotatable member carrying the other end of said spring, a second member having a yieldable engagement with and concentrically mounted with said rotatable member, and means carried by said second member whereby said members may be moved in unison.

FRANK W. ROLLER.